(12) United States Patent
Satou et al.

(10) Patent No.: US 10,409,266 B2
(45) Date of Patent: Sep. 10, 2019

(54) NUMERICAL CONTROLLER FOR CONTROLLING OVERLAP OF PRESS OPERATIONS

(71) Applicant: FANUC CORPORATION, Minamitsuru-gun, Yamanashi (JP)

(72) Inventors: Takashi Satou, Yamanashi (JP); Takeshi Mochida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/817,814

(22) Filed: Nov. 20, 2017

(65) Prior Publication Data

US 2018/0143618 A1 May 24, 2018

(30) Foreign Application Priority Data

Nov. 22, 2016 (JP) .................................. 2016-226716

(51) Int. Cl.
*G05B 19/4155* (2006.01)
*G05B 19/402* (2006.01)

(52) U.S. Cl.
CPC ....... *G05B 19/4155* (2013.01); *G05B 19/402* (2013.01); *G05B 2219/34175* (2013.01); *G05B 2219/43197* (2013.01); *G05B 2219/45143* (2013.01)

(58) Field of Classification Search
CPC ........... G05B 2219/34175; G05B 2219/42113; G05B 2219/45152; G05B 2219/49354; G05B 19/19; G05B 19/401
See application file for complete search history.

(56) References Cited

U.S. PATENT DOCUMENTS

| 5,435,216 A | * | 7/1995 | Murphy | ................. B21D 28/12 83/13 |
| 5,931,070 A | | 8/1999 | Miyajima et al. | |
| 6,067,778 A | * | 5/2000 | Yamamoto | ................ B65B 9/20 226/30 |

(Continued)

FOREIGN PATENT DOCUMENTS

| JP | 06039452 A | 2/1994 |
| JP | 0910858 A | 1/1997 |
| JP | 08108300 A | 4/1999 |

(Continued)

OTHER PUBLICATIONS

Notification of Reasons for Refusal for Japanese Application No. JP 2016-226716, dated Jun. 26, 2018, 4 pages.

*Primary Examiner* — Thomas C Lee
*Assistant Examiner* — Charles Cai
(74) *Attorney, Agent, or Firm* — RatnerPrestia

(57) ABSTRACT

A numerical controller is provided with an axis motion control unit configured to control the motions of a table axis and a press axis according to a machining program. The axis motion control unit starts the motion of the press axis for a first block at a first top dead center, if the state of the table axis satisfies a condition adapted for the start of the motion of the press axis for the second block and if the motion of the press axis for the first block is not completed, and the axis motion control unit starts the motion of the press axis for a second block at a second top dead center lower than the first top dead center, thereby overlapping the motions of the press axis for the first and second blocks.

3 Claims, 7 Drawing Sheets

(56) References Cited

U.S. PATENT DOCUMENTS

2008/0295564 A1* 12/2008 Kaneko .................. B21D 43/05
  72/405.13
2015/0309498 A1    10/2015 Aizawa et al.

FOREIGN PATENT DOCUMENTS

| JP | 2001-198632 A | 7/2001 |
| JP | 2003320488 A | 11/2003 |
| JP | 2015210563 A | 11/2015 |

* cited by examiner

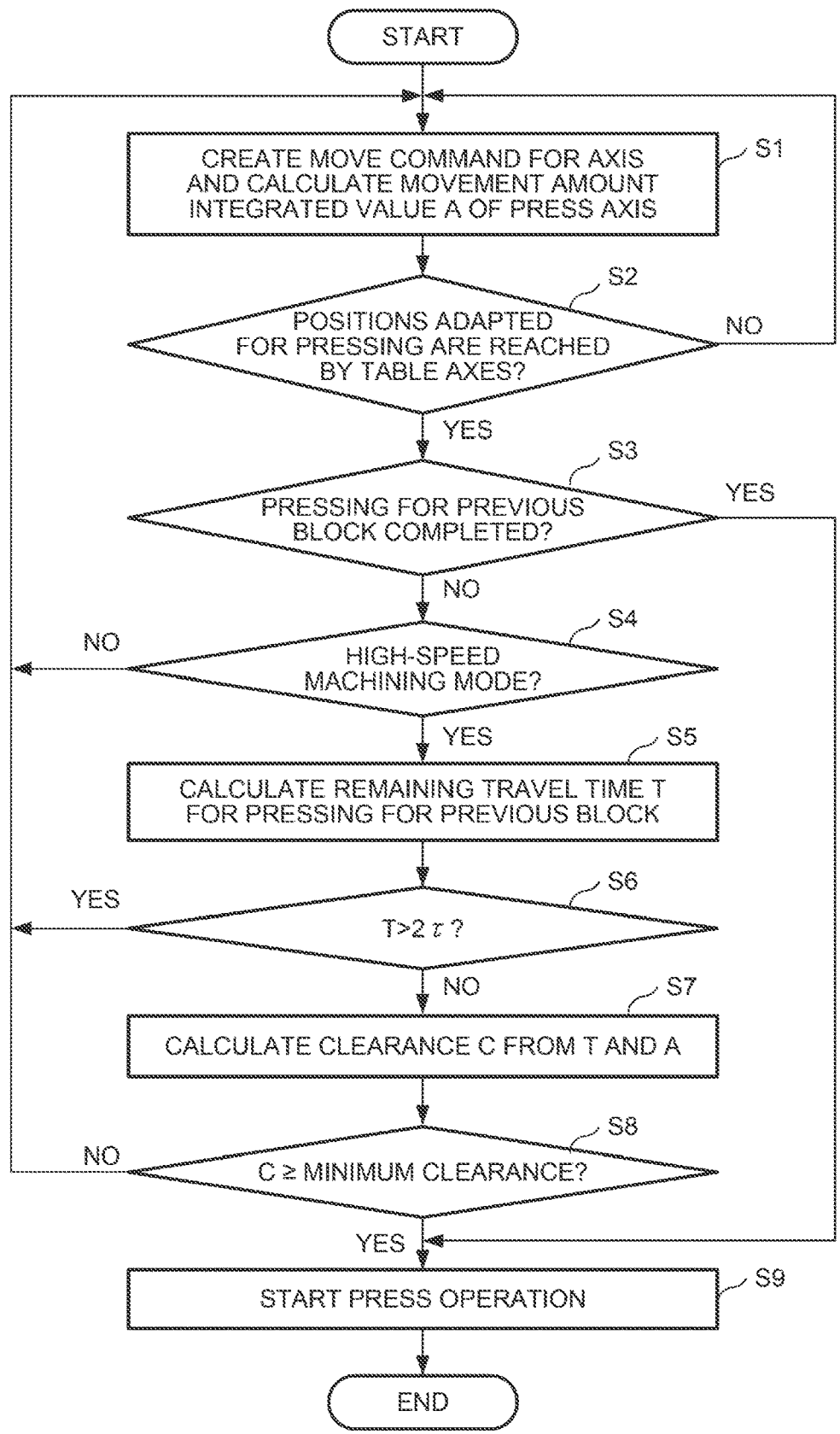

NUMERICAL CONTROLLER FOR CONTROLLING OVERLAP OF PRESS OPERATIONS

CROSS-REFERENCE TO RELATED APPLICATIONS

This application is a new U.S. patent application that claims benefit of 2016-226716, filed Nov. 22, 2016, the disclosure of this application is being incorporated herein by reference in its entirety for all purposes.

BACKGROUND OF THE INVENTION

Field of the Invention

The present invention relates to a numerical controller, and more particularly, to a numerical controller capable of speeding up the motion of a press axis if the amount of movement of table axes is small.

Description of the Related Art

In punch pressing, a numerical controller reduces the total machining time by achieving coincidence between the completion of motions of table axes (X- and Y-axes) and the start of a motion of a press axis and between the completion of the motion of the press axis and the start of the motions of the table axes. Such a motion control method will hereinafter be referred to as overlapping.

FIG. 1 is a diagram showing an example of overlap control. In (I) of FIG. 1, the operation of a punch head is started at a time (A) preceding the time of completion of the motions of the X- and Y-axes by a specified time interval in a block 1. Moreover, the motions of the X- or Y-axis in a block 2 are started at a time point (B) at which the punch head leaves a workpiece without waiting for the completion of the operation of the punch head in the block 1.

If the amount of movement of the X- and Y-axes is small as indicated by (II) of FIG. 1 when the overlap control of this type is performed, the completion of the motions of the X- and Y-axes in the block 2 may sometimes precede the completion of the operation of the punch head in the block 1. In this case, the next operation of the punch head is started after waiting for the completion (C) of the operation of the punch head in the block 1.

Specifically, if the amount of movement of the table axes is small, the operation of the punch head in the previous block is not completed even if the table axes has reached a time (D) where press operation is allowed, so that a waiting time or dead time (E) may be caused before the start of the next operation of the punch head, in some cases (see FIG. 2). Thus, there arises problem that the hit rate which shows the number of punching per minute hits a peak.

Possibly, the machining time may be reduced by overlapping the motions of the press axis. However, there arises a problem that the synchronization with the table axes or a clearance cannot be secured. The clearance is a space between a press start position and the upper surface of the workpiece. An optimum value for the clearance is determined depending on the thickness and material of the workpiece, the tool used, and the like. The clearance may cause machining defects, such as undesirable burrs, if it is too large or too small.

Possibly, furthermore, the machining time may be reduced by changing the set value of the clearance for each of conditions such as the workpiece thickness. Since a press operation pattern must be provided for each condition, however, the operational load is high.

Japanese Patent Application Laid-Open No. 2001-198632 discloses an arrangement in which the dead time is reduced by adjusting the acceleration and deceleration between press operations in a press mechanism comprising a crank mechanism and configured to rotate in a fixed direction.

However, Japanese Patent Application Laid-Open No. 2001-198632 does not still disclose a method for overlapping the motions of a press axis. Moreover, the arrangement described in Japanese Patent Application Laid-Open No. 2001-198632 has a problem that the stroke (extent of a vertical motion) of presses is affected by the mechanism of the press axis.

SUMMARY OF THE INVENTION

The present invention has been made to solve these various problems and its object is to provide a numerical controller capable of achieving high-speed machining by overlapping the motions of a press axis if the amount of movement of table axes is small.

A numerical controller according to the present invention includes an axis motion control unit configured to control the motions of a table axis and a press axis according to a machining program. The axis motion control unit is configured to start the motion of the press axis for a first block at a first top dead center, and to start, if the state of the table axis satisfies a condition adapted for the start of the motion of the press axis for the second block and if the motion of the press axis for the first block is not completed, the motion of the press axis for a second block at a second top dead center lower than the first top dead center, thereby overlapping the motions of the press axis for the first and second blocks.

The numerical controller may include a determination unit configured to calculate, when the state of the table axis satisfies the condition adapted for the start of the motion of the press axis for the second block and when the motion of the press axis for the first block is not completed, a predicted top dead center for the case in which the overlapping is started at the present point in time, based on a remaining time for the motion of the press axis for the first block, and to cause the axis motion control unit to start the overlapping if the height of the predicted top dead center is not lower than a predetermined threshold.

The axis motion control unit may be configured to execute the overlapping when a high-speed machining mode is ON.

According to the present invention, there can be provided a numerical controller capable of achieving high-speed machining by overlapping the motions of a press axis if the amount of movement of table axes is small.

BRIEF DESCRIPTION OF THE DRAWINGS

FIG. 9 is a flowchart showing the operation of the numerical controller;

DETAILED DESCRIPTION OF THE PREFERRED EMBODIMENTS

Figure 12:
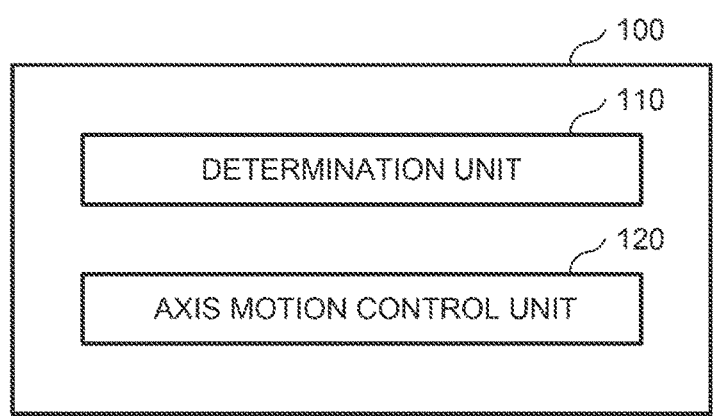
FIG. 12 is a block diagram showing the configuration of the numerical controller.

FIG. 12 is a block diagram showing the configuration of a numerical controller 100 according to an embodiment of the present invention.

The numerical controller 100 comprises a determination unit 110 and an axis motion control unit 120. The numerical controller 100 is an information processor typically provided with a central processing unit (CPU), storage device, and input/output device and configured to logically implement the determination unit 110 and the axis motion control unit 120 as the CPU executes a predetermined program.

The determination unit 110 performs processing for monitoring the motions of table axes (X- and Y-axes) and a press axis and determining whether or not the motion of the press axis can be overlapped.

The axis motion control unit 120 controls the motions of the table axes (X- and Y-axes) and the press axis according to the machining program and performs control for overlapping the motion of the press axis in response to a command from the determination unit 110.

Figure 1:
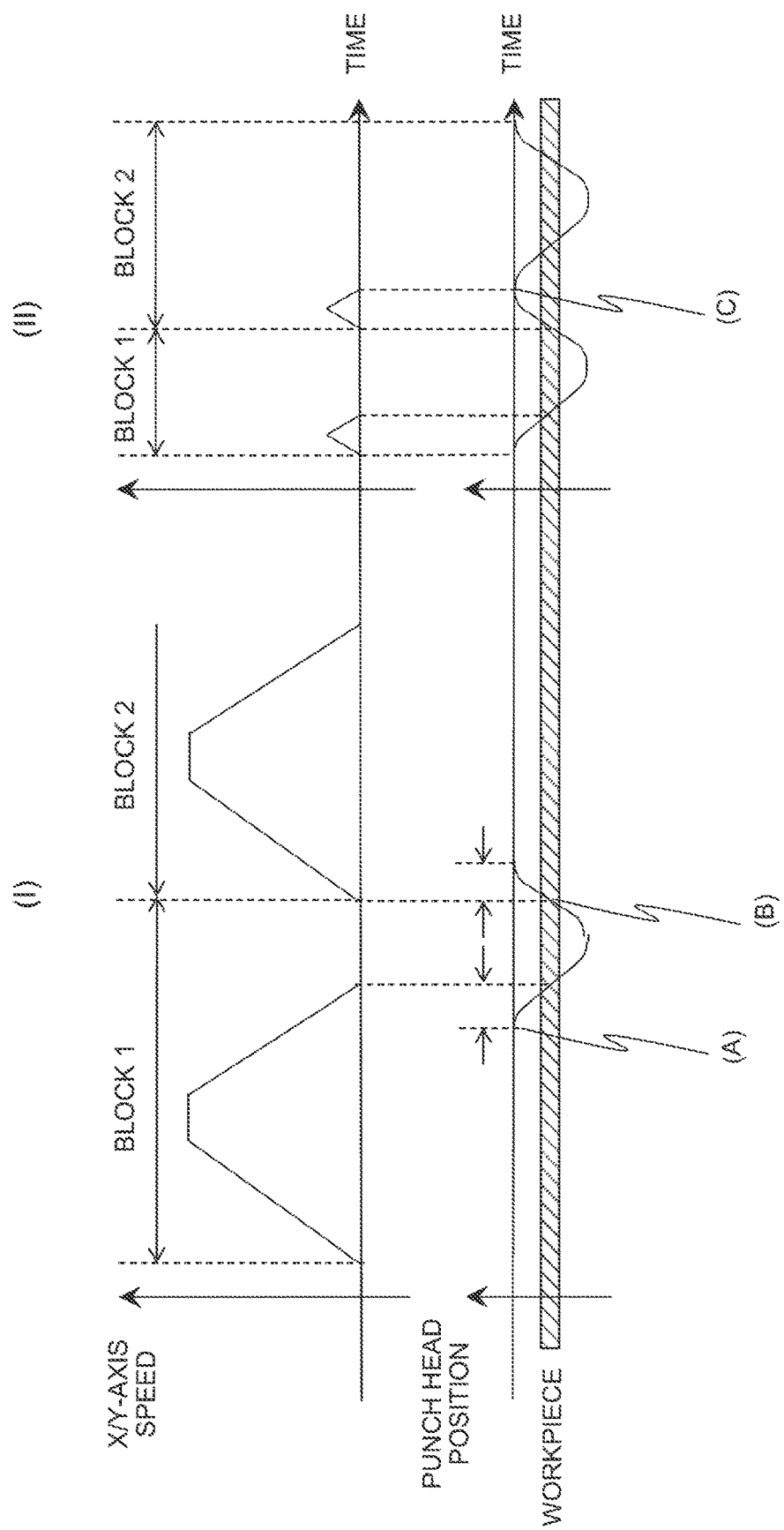
FIG. 1 is a diagram showing an example of conventional overlap control.
Figure 2:
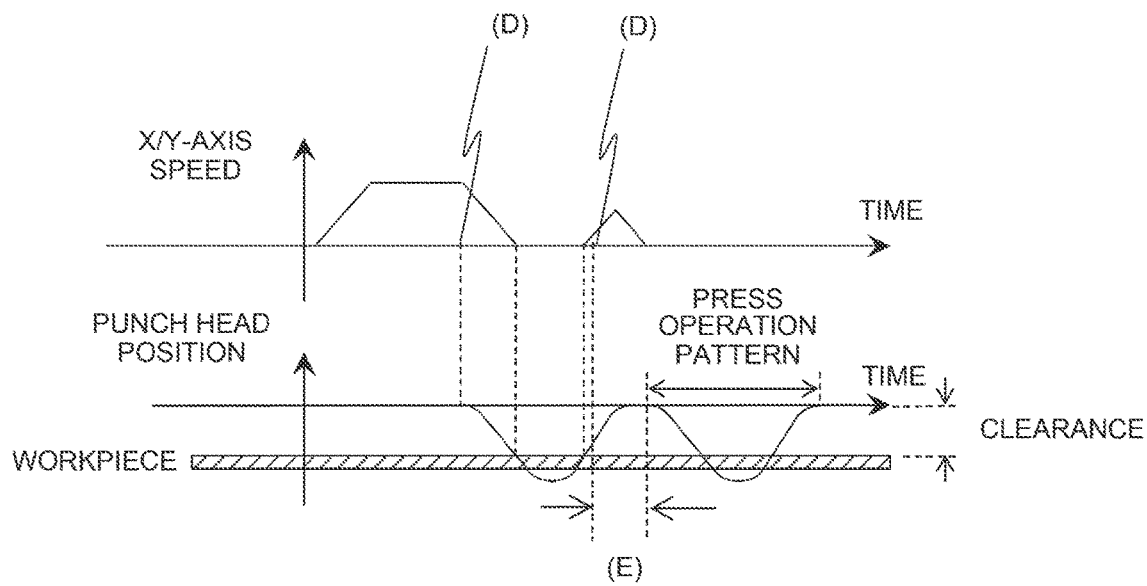
FIG. 2 is a diagram showing an example of conventional overlap control.
Figure 3:
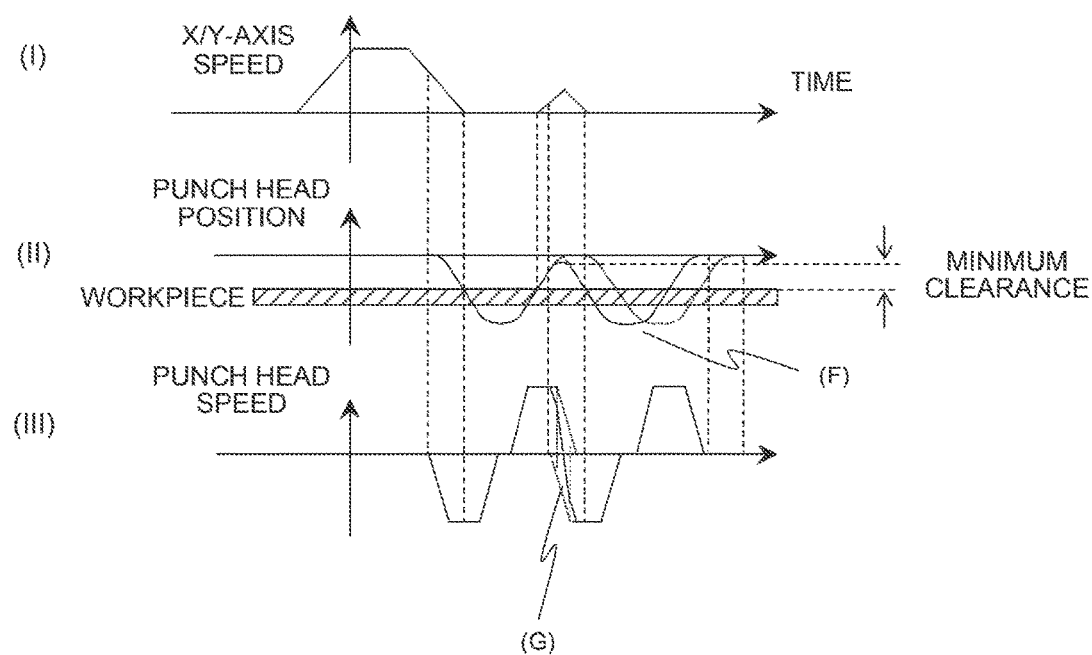
FIG. 3 is a diagram showing the operation of a numerical controller according to an embodiment of the present invention.

An outline of the operation of the numerical controller 100 will now be described with reference to FIG. 3.

First, the determination unit 110 detects a state in which the states of the table axes satisfy conditions for the start of a press operation and the press operation for the previous block is not completed. If the states of the table axes satisfy the conditions for the start of the press operation, then temporal conditions in which overlapping of the table axes and the press axis can be started are met. More specifically, the satisfaction of the starting conditions implies the passage of the point in time preceding the estimated time for the completion of the motions of the table axes by a necessary time interval during which a punch head having started its operation at the top dead center reaches the upper surface of a workpiece.

When the determination unit 110 detects the above-described state, the axis motion control unit 120 can start the press operation for the next block by overlapping it with the press operation for the previous block. If the distance (clearance) between the position of the punch head and the upper surface of the workpiece is too short as this is done, however, machining defects easily occur. Thereupon, in the present embodiment, the minimum value of the clearance (hereinafter referred to as the minimum clearance) to be maintained is defined as another condition for starting the overlapping between the press operations. When the above-described state is detected and if the minimum clearance is obtained by the position of the punch head, the determination unit 110 commands the axis motion control unit 120 to start overlap control for the press operations. In this way, the numerical controller 100 can improve the hit rate while maintaining the machining quality. In (II) and (III) of FIG. 3, full lines represent the position and speed of the punch head for the case in which the press operations are overlapped, while broken lines represent the position and speed of the punch head for the case in which the press operations are not overlapped. The overlap control for the press operations indicates that the operation changes at positions (F) and (G).

Here the minimum clearance (also referred to as a second top dead center) is a parameter separate from a conventionally used clearance (also referred to as a first top dead center) and these two parameters can coexist with each other. The conventional clearance has a value set for each of conditions such as a workpiece thickness, and a press operation pattern is also provided for each of these conditions. On the other hand, the parameter introduced as the minimum clearance according to the present embodiment can be freely set independently of the operation pattern by a user. Therefore, the user can set and chance the minimum clearance without changing the operation pattern. It is to be understood that the relation "conventional clearance>minimum clearance" holds.

In some cases, the conventional clearance may be set with a tolerance in consideration of warp or undulation of the workpiece. If the amount of table movement is small, however, the influence of the warp or undulation of the workpiece is so small that machining can be carried out without the interference be the workpiece and a tool despite the use of the minimum clearance (second top dead center) smaller than the conventional clearance (first top dead center).

The determination unit 110 or the axis motion control unit 120 may be configured to switch the presence or absence of implementation of the overlapping between the press operations in response to an M code, input signal, or the like. Thus, if high-speed machining is not required, higher machining qualities can be pursued without overlapping the press operations.

Figure 4:
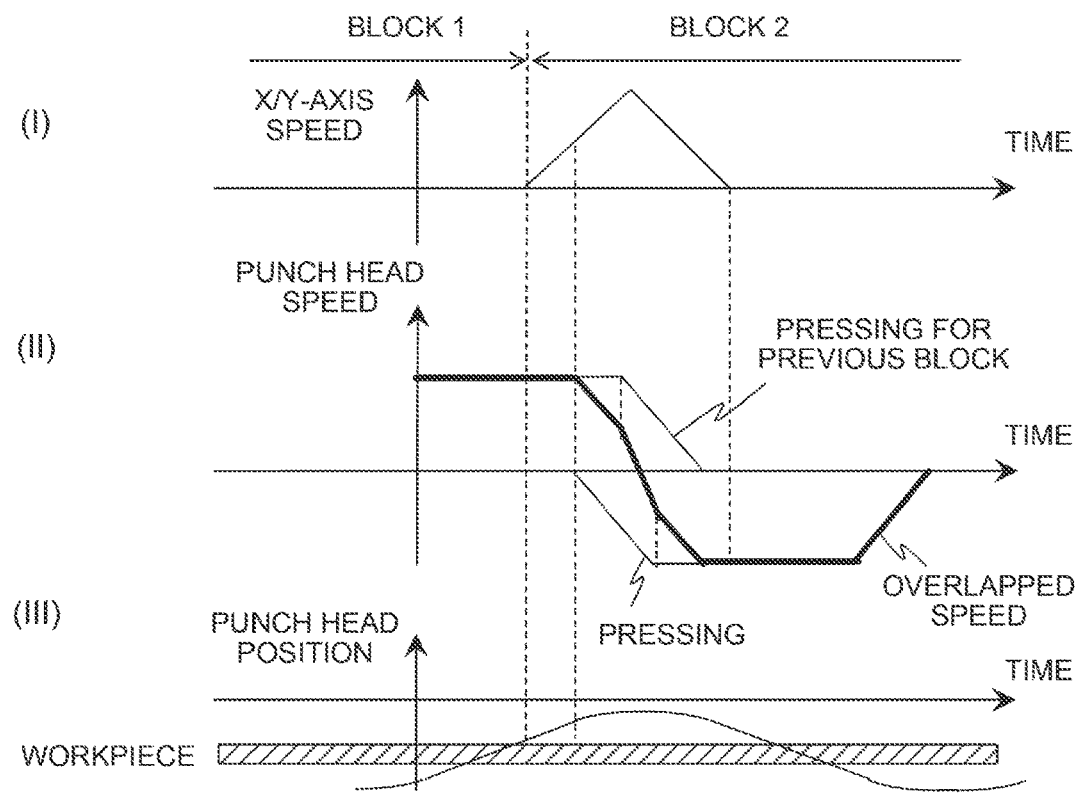
FIG. 4 is a diagram showing a method for overlapping the motions of press axes.

A method in which the axis motion control unit 120 overlaps the motions of the press axis will be described further in detail with reference to FIG. 4.

At the start of the overlapping, the axis motion control unit 120 adds pulses of the press operation for the previous block (also referred to as a first block) to pulses of the press operation for the next block (also referred to as a second block). Thus, the punch head changes its speed in the manner indicated by (II) of FIG. 4 and operates at an overlapped speed. Moreover, the punch head position changes with the passage of time as indicated by (III) of FIG. 4.

Figure 5:
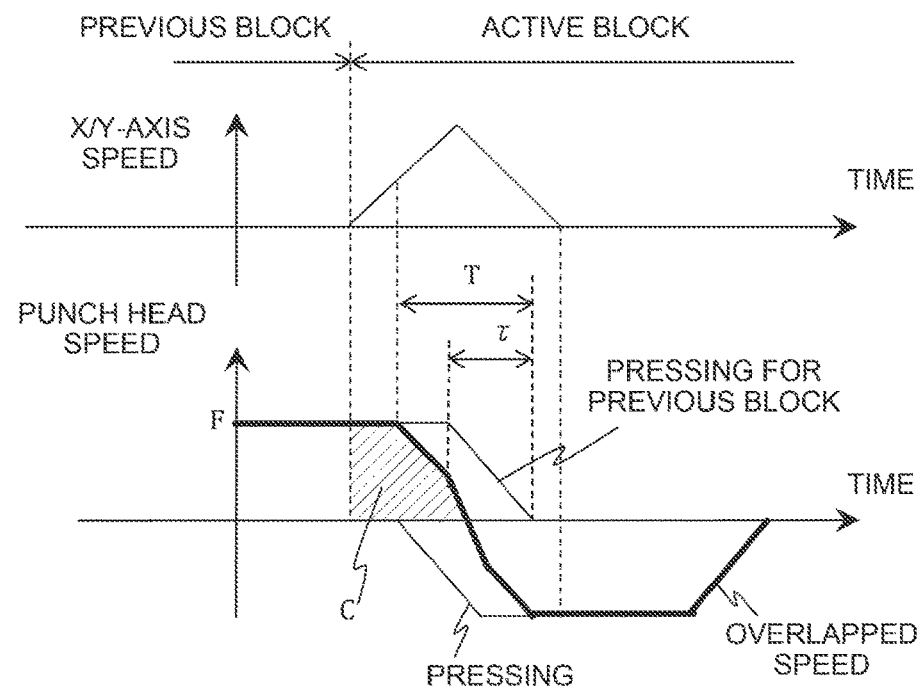
FIG. 5 is a diagram showing a method for calculating a clearance (predicted top dead center)

A method in which the determination unit 110 detects the maintenance of the minimum clearance will be described with reference to FIG. 5.

An integrated value of the amount of movement of the punch head from the start of the block (point in time when the punch head leaves the workpiece) to the present time is assumed to be A. Moreover, the distance between the punch head and the upper surface of the workpiece at a point in time when the punch head speed should become 0 if the overlapping is started at the present time is assumed to be a clearance C. In other words, the clearance C is the amount of movement of the punch head from the block start until the punch head speed becomes 0. The determination unit 110 calculates the value of the clearance C (also referred to as a predicted top dead center) predicted at the time concerned at regular time intervals and starts the overlapping when "clearance C≥minimum clearance" is obtained.

Here a remaining travel time T for the press operation for the previous block is defined as follows:

In case in which distribution pulses P remain:

$$T=P/F+\tau.$$

In case in which the distribution pulses P do not remain:

$$T=\tau-f/F.$$

The case in which the distribution pulses P remain is a case in which the punch head is moving at a command speed. On the other hand, the case in which the distribution pulses P do not remain is a case in which the punch head is decelerating. Symbol τ denotes the time constant of pressing, that is, the time required for attaining the command speed, and F denotes a command speed of the pressing.

The clearance C is obtained according to the following equations based on the remaining travel time T for the press operation for the previous block.

Figure 6:
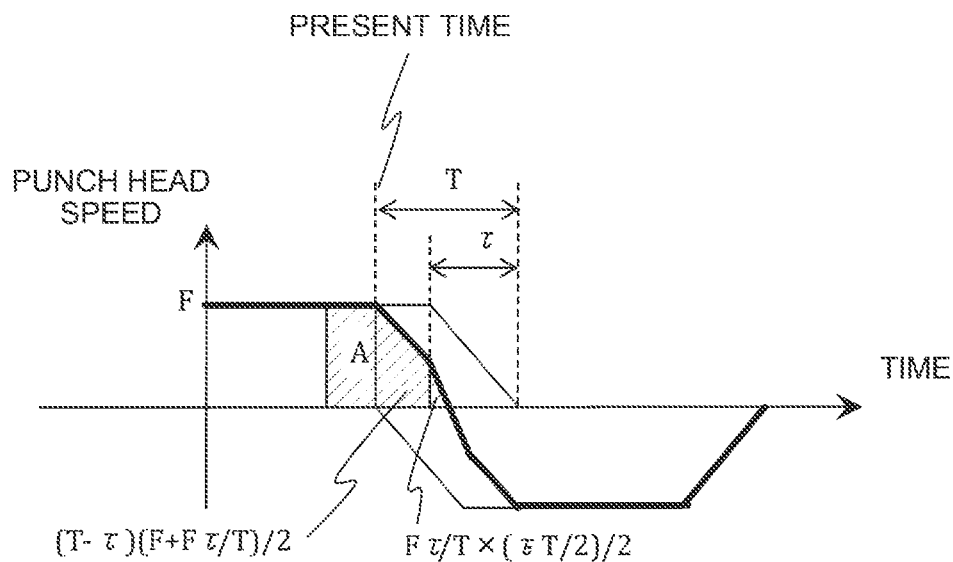
FIG. 6 is a diagram showing a method for calculating the clearance (predicted top dead center)

In case of 2τ≥T>τ (see FIG. 6)

$$C=A+(T-\tau)(F+F\tau/T)/2+F\tau/T\times(\tau-T/2)/2=A+(2FT-F\tau)/4. \quad (1)$$

Figure 7:
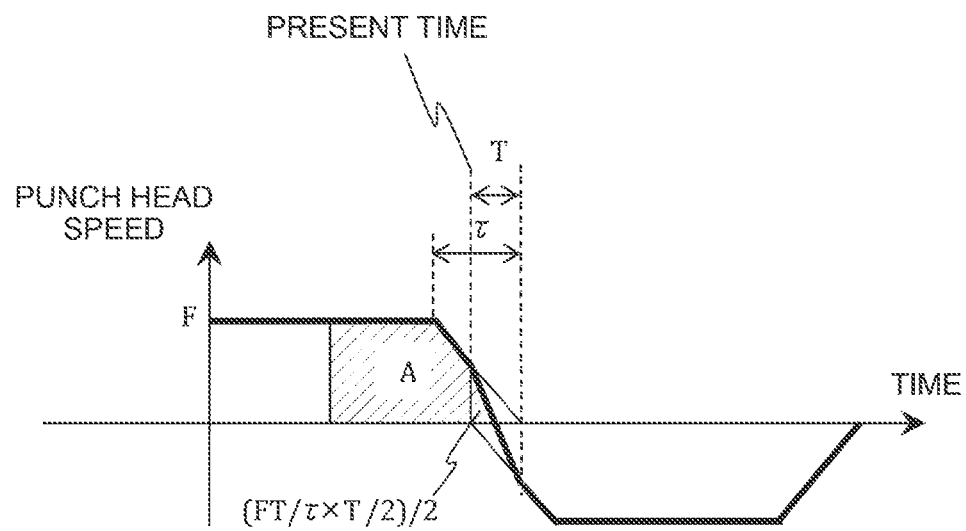
FIG. 7 is a diagram showing a method for calculating the clearance (predicted top dead center)

In case of τ≥T (see FIG. 7)

$$C=A+(FT/\tau\times T/2)/2=A+FT^2/4\tau. \quad (2)$$

Figure 8:
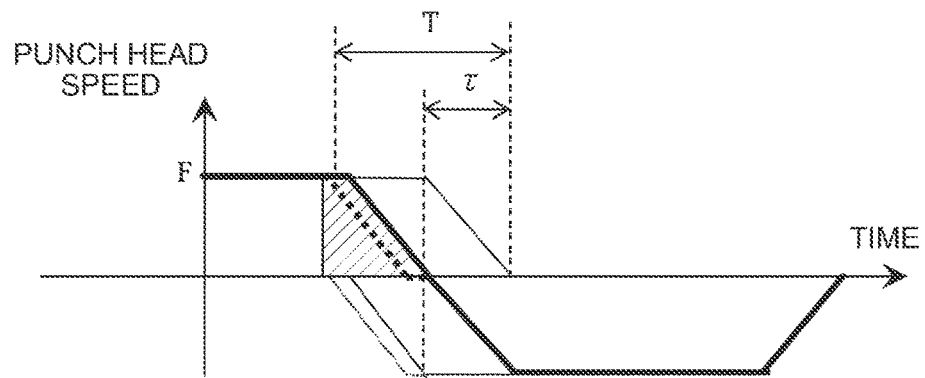
FIG. 8 is a diagram showing a method for calculating the clearance (predicted top dead center)
Figure 10:
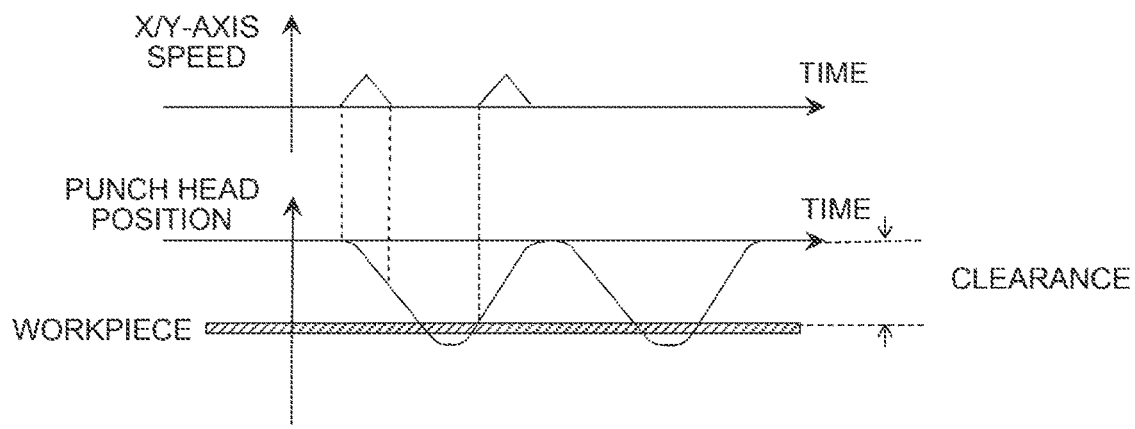
FIG. 10 is a diagram showing an example of a press operation.

In case of T≥2τ, overlapping is performed so that "T=τ" is obtained, thereby clamping the time for the start of the pressing (see FIG. 8). This is a state in which the pressing is performed with a large stroke and clearance, as shown in FIG. 10. Such pressing is performed if the press axis produces great heat, for example. Normally, the high-speed machining is not required in this case. Equation (1) or (2) described above is used as a computational formula for the clearance C.

The operation of the numerical controller 100 will be described with arrangement with reference to the flowchart of FIG. 9.

Step S1: The axis motion control unit 120 creates a move command for the press axis. The determination unit 110 calculates the movement amount integrated value A of the press axis at regular time intervals after the start of the block (when the punch head leaves the workpiece).

Step S2: The determination unit 110 determines whether or not positions in which the press operation for the next block can be carried out are reached by the table axes. If these positions are reached, the processing proceeds to Step S3. If not, the processing returns to Step S1.

Step S3: The determination unit 110 determines whether or not the press operation for the previous block is completed. If the press operation is not completed, the processing proceeds to Step S4. If the press operation is completed, the processing proceeds to Step S9.

Step S4: The determination unit 110 determines whether or not a high-speed machining mode is on. If the high-speed machining mode is on, the processing proceeds to Step S5. If not, the processing returns to Step S1.

Step S5: The determination unit 110 calculates the remaining travel time T for the pressing for the previous block.

Step S6: The determination unit 110 determines whether or not "T>2τ" is obtained. If the determination result is NO, the processing proceeds to Step S7. If the determination result is YES, the processing returns to Step S1.

Step S7: The determination unit 110 calculates the clearance C according to equation (1) or (2) using T and A.

Step S8: The determination unit 110 determines whether or not "C≥minimum clearance" is obtained. If the determination result is YES, the processing proceeds to Step S9. If the determination result is NO, the processing returns to Step S1.

Step S9: The determination unit 110 instructs the axis motion control unit 120 to start the overlap control for the press operations. The axis motion control unit 120 starts the press operation for the next block so as to overlap the press operation for the previous block.

According to the present embodiment, the numerical controller 100 accepts the setting of the minimum clearance that is smaller than the conventional clearance. The press operations are overlapped between the blocks so that the punch head speed becomes 0 when the minimum clearance is achieved by the punch head. Thus, high-speed machining can be achieved even if the amount of movement of the table axes is small.

The present invention is not limited to the above-described embodiment and may be suitably changed without departing from the spirit of the invention. Any of the constituent elements of the embodiment may be modified or omitted without departing from toe scope of the invention.

Figure 11:
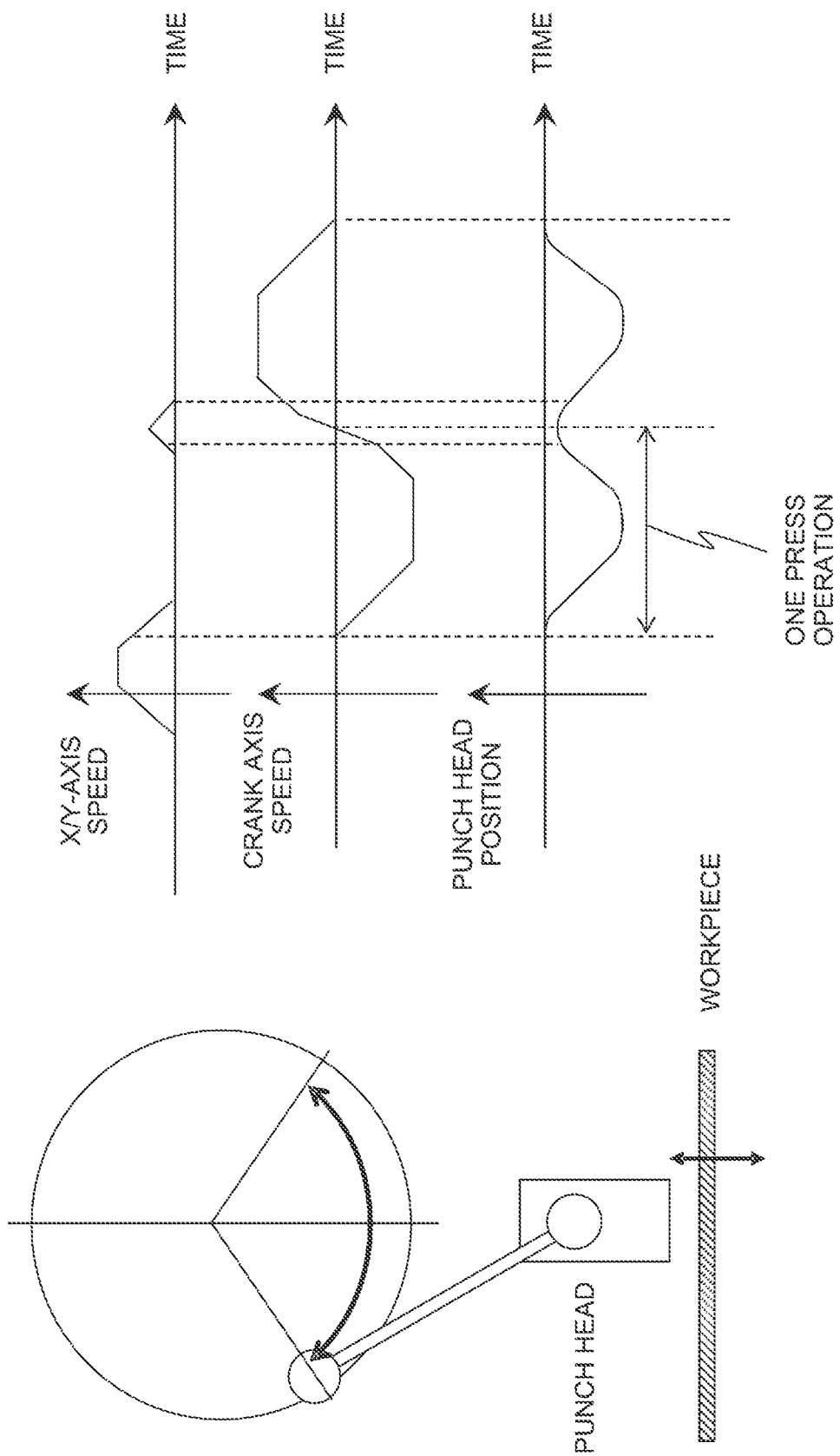
FIG. 11 is diagram showing the operation of the numerical controller using a crank axis as a press axis.

While the above-described embodiment is based on the assumption that the press axis moves on a straight axis, for example, the present invention is also applicable to the case in which the press axis is a crank axis, as shown in FIG. 11. In this arrangement, after the crank axis starts to rotate and completes the press operation, the punch head reaches the top dead center so that the rotational speed of the crank axis is 0. Thereafter, the direction of the rotation of the crank axis is changed and the next press operation is started. The numerical controller 100 can change the top dead center of the punch head by overlapping the rotary motion of the crank axis between such a plurality of press operations. Thus, as in the embodiment described above, the press operations can be overlapped between the blocks so that the punch head speed becomes 0 when the minimum clearance is achieved by the punch head.

Moreover, although the determination unit 110 carries out the overlapping of the press operations only when the high-speed machining mode is ON (Step S4) in the embodiment described above, this determination step need not always be provided and may be omitted as required.

The invention claimed is:

1. A numerical controller comprising:
a processor configured to control the motions of a table along a table axis and a press along a press axis according to a machining program having a first block and a second block,
wherein according to the machining program, the processor is configured to:
1) start the motion of the press axis for the first block at a first top dead center, and
2) start the motion of the press axis for the second block at a clearance lower than the first top dead center, thereby overlapping the motions of the press axis for the first and second blocks, when:
   a) the state of the table axis satisfies a condition adapted for the start of the motion of the press axis for the second block,
   b) the motion of the press axis for the first block is not completed, and
   c) the clearance is greater than or equal to a minimum clearance, the clearance calculated based on a remaining travel time for the press in the first block and an amount of movement of the press measured from a start of the second block.

2. The numerical controller according to claim 1, wherein the processor is further configured to:
calculate, when the state of the table axis satisfies the condition adapted for the start of the motion of the press axis for the second block and when the motion of the press axis for the first block is not completed, a predicted top dead center for the case in which the overlapping is started at the present point in time, based on a remaining time for the motion of the press axis for the first block, and
cause the axis motion control unit to start the overlapping if the height of the predicted top dead center is not lower than a predetermined threshold.

3. The numerical controller according to claim 1, wherein the axis motion control unit executes the overlapping when a high-speed machining mode is ON.

* * * * *